(12) United States Patent
Beye

(10) Patent No.: US 12,437,109 B2
(45) Date of Patent: Oct. 7, 2025

(54) PRIVACY AS A SERVICE

(71) Applicant: Bank of America Corporation, Charlotte, NC (US)

(72) Inventor: Rick A. Beye, Highland Beach, FL (US)

(73) Assignee: Bank of America Corporation, Charlotte, NC (US)

( * ) Notice: Subject to any disclaimer, the term of this patent is extended or adjusted under 35 U.S.C. 154(b) by 648 days.

(21) Appl. No.: 17/690,806

(22) Filed: Mar. 9, 2022

(65) Prior Publication Data

US 2023/0289472 A1 Sep. 14, 2023

(51) Int. Cl.
G06F 21/62 (2013.01)
G06F 21/60 (2013.01)

(52) U.S. Cl.
CPC ........ *G06F 21/6254* (2013.01); *G06F 21/602* (2013.01); *G06F 2221/2129* (2013.01)

(58) Field of Classification Search
CPC ............... G06F 21/6254; G06F 21/602; G06F 2221/2129
See application file for complete search history.

(56) References Cited

U.S. PATENT DOCUMENTS

| | | | |
|---|---|---|---|
| 8,634,821 B2 * | 1/2014 | Raleigh | H04M 15/8094 455/419 |
| 9,083,689 B2 | 7/2015 | Lindemann et al. | |
| 9,391,985 B2 | 7/2016 | Hefetz | |
| 10,373,167 B2 * | 8/2019 | Zovi | G06Q 20/4016 |
| 11,068,881 B2 | 7/2021 | Beye | |
| 12,022,282 B2 | 6/2024 | Rolfe | |
| 2017/0132633 A1 * | 5/2017 | Whitehouse | H04L 63/08 |
| 2019/0207772 A1 * | 7/2019 | Hecht | H04L 63/10 |
| 2020/0344260 A1 * | 10/2020 | Dash | H04L 9/0875 |

FOREIGN PATENT DOCUMENTS

WO 2019032301 A1 2/2019

* cited by examiner

*Primary Examiner* — Sm A Rahman
(74) *Attorney, Agent, or Firm* — Banner & Witcoff, Ltd.

(57) ABSTRACT

Aspects of the disclosure are directed to protecting individual privacy during a service transaction. The mobile device identity is separated from the individual's identity when the individual is consuming the provided services. One aspect enables the connection between the individual's identity and the mobile device identifiers to be broken by binding ownership of the physical device to a separate entity called the privacy provider service (PPS). With one aspect a computing platform supports communications between a PPS device and another computing device by supporting a communications token. When the PPS device transfers the communication token to the other device, the other device can submit the communications token to the computing platform. The platform subsequently establishes a communication channel among the devices and the platform so that the device identities are masked from each other. Other aspects support other service transaction types including payment transfers and consumption of internet application services.

19 Claims, 11 Drawing Sheets

PRIVACY AS A SERVICE

BACKGROUND

All too often, individuals obtain services and merchandise from businesses that are hacked. There are way too many instances. For example, in May 2018, a social media platform notified users of a glitch that stored passwords unmasked in an internal log, making all user passwords accessible to the internal network. The social media platform told its users to change their passwords but the company said it fixed the bug and that there was no indication of a breach or misuse, but encouraged the password update as a precaution. The social media platform did not disclose how many users were impacted but indicated that the number of users was significant and that they were exposed for several months. With another example, a database containing records of over 300,000 customers of a chain store was exposed in March 2021 after the company suffered a cloud-bucket misconfiguration. The disclosed information included customer names, phone numbers, physical and email addresses, and the last four digits of their payment card, as well as the source code for the company's app. With another example, data associated with users of another social media platform was posted for sale in a Dark Web forum on June 2021. This exposure impacted 92% of the total user base of 756 million users. The data was dumped in two waves, initially exposing 500 million users, and then a second dump where the unauthorized user boasted that they were selling a database of 700 million users of the social media platform. With yet another example, in August 2021 a wireless telecommunication carrier had a breach in which unauthorized actors obtained personal information belonging to more than 40 million past, present and potential customers. Consequently, full names, date of birth, social security numbers, and information from driver's licenses as well as unique identifiers for customers' phones were leaked, potentially putting millions of those at a greater risk of identity theft. These examples underscore the importance of providing privacy for individuals when obtaining goods and services.

SUMMARY

Aspects of the disclosure are directed to protecting individual privacy. The mobile device identity is separated from the individual's identity when the individual is consuming the provided services. With one aspect the connection between the individual's identity and the mobile device identifiers is broken by binding ownership of the physical device to a separate entity called the Privacy Provider Service (PPS). A PPS computing platform fully executes the functionality on behalf of the PPS device user.

In one or more embodiments, a PPS computing platform supports communications between a PPS device and another computing device by generating and transferring a communications token. When the PPS device transfers the communication token to the other device, the other device can submit the communications token to the PPS computing platform. The platform subsequently establishes a communication channel among the devices and the platform so that the device identities are masked from each other device.

In one or more embodiments, a PPS computing platform supports payment transfers from a PPS user to another party such as a merchant or another individual. The payment sources of a PPS user may be bound to the device anonymously and upon emitting a payment token the appropriately selected user resource is evaluated for funding. If funds are available, the payment is made anonymously in the form of a cash equivalent token. The PPS provider may also be the source of the funding resource based on direct access to the user's accounts or be authorized to broker the funding on behalf of the device user's designated financial institution. The PPS guaranteed cash equivalent token is disbursed over the appropriate channel to the payee.

In one or more embodiments, a PPS computing platform supports internet application services (for example, streaming content delivery) for a PPS user. The PPS computing platform maintains user accounts for any website that the PPS user chooses to visit or belong to under an anonymous token issued by the PPS provider and scoped to the website. Upon browsing to a website from the PPS device, the login authentication to that website may be brokered by the PPS computing platform. Only the PPS computing platform knows the credentials required and can provide randomized password changes at randomized intervals on the account that represents the PPS user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
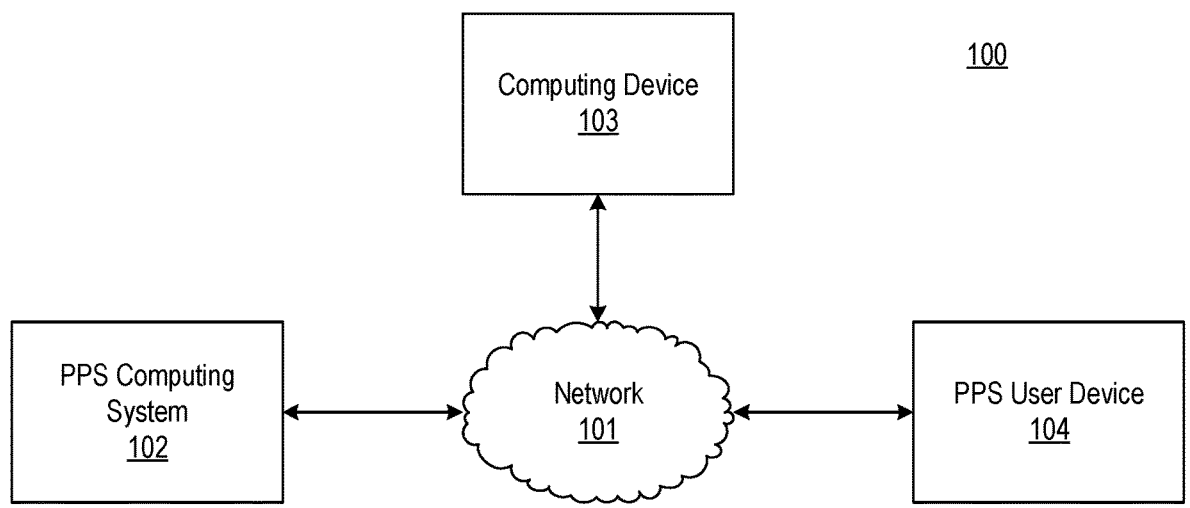
FIG. 1 depicts an illustrative computing environment for supporting privacy as a service (PaaS) in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to protecting individual privacy by separating mobile device identity from the individual's identity when the individual is consuming the services provided by that device.

With traditional approaches, tracking and capturing a user's data (for example, GPS location) based on an individual's use of a mobile device is often exploited. Examples include any device that is portable and enabled for wireless connectivity, such as laptop computers, mobile phones, mobile watches and rings, and virtual reality goggles. Mobile devices deliver services based on the communication technology bound into their physical structure. A unique and individually assigned phone number arising out of historical telecom practices as well as silicon based chip identifiers (for example, communication identifiers such as EID\SIMM\MAC) and operating system or application based identifiers (for example, advertiser ID) when communicated over the available wireless communication channels (for example, telecom carriers, internet service providers, Bluetooth®, RFID, NFID, etc.) expose device users to unrestricted privacy invasion.

With as aspect of the embodiments, the connection between the individual's identity and the mobile device identifiers is broken by binding ownership of the physical device to a separate computing system supported by a privacy provider service (PPS) provider.

A PPS provider acquires the device and privately and securely delivers the device to the individual whose identity the PPS is protecting. Regular upgrades of the device as well as operating system and application upgrades are managed exclusively by the PPS. Only the PPS provider knows which device is possessed by which individual and which applications are installed on the device. For example, the PPS provider registers the SIMM with the telecom provider in the PPS provider's name under the service plan selected by the PPS user when the PPS user enrolls in the PPS privacy plan. The PPS provider makes all payments in provider's name to the telecom from the funds made available by the PPS user to the PPS provider. The PPS computing system maps the phone number assigned by the telecom to the device internally to its records using a token to reference the PPS user in possession of the device. The PPS user has no knowledge of the number assigned to the device or its representation during a communication event. All device operating system or application access to all identifiers is restricted to be accessible only by the PPS. Web site cookies may be allowed at user discretion since anonymity is protected by the PPS.

Once the device is in the possession of the protected PPS user, the user is free to complete all manner of application transactions, for example payments and application downloads, anonymously. When the transaction requires one, the device may emit an anonymous global user identifier (GUID) bearing the signature of the PPS provider for authentication and authorization which may be assigned dynamically and managed by the PPS provider. Only the PPS provider knows the mapping of that GUID to the PPS user possessing the device.

The PPS provider is the legal entity accountable for all transactions emanating from possession of the device and must strongly bind device access to a highly reliable multifactor authentication schema including biometric and GPS tracking data and preferably multi device near-field communication signaling. With some embodiments, the device is only powered on when the multifactor authentication is established and powered off if any of the components of authentication fail a periodic persistency test.

The following terms are used in the following description of the embodiment.

Token: A token is the product of a software application that creates a transmissible data structure which may be encrypted for security, signed for authentication using a certificate authority, or compressed for band width efficiency, prior to transmission. The data structure may conform, in whole or in part, to W3 or other industry published standards or be privately composed, in whole or in part, such that it can only be decomposed by proprietary software thereby enhancing its security.

For example, a token is a software voucher that can be exchanged for goods or services. The token may comprise a data structure having a plurality of data elements (components) that identify the PPS user identify the PPS provider, characterize general attributes of the token, and characterize a PPS service conveyed by the token. Some or all of the data elements may be encrypted or hashed as well as the service token itself.

Exemplary data elements may include unique transaction identifier, global identifier of PPS user (for example, GUID), identifier of PPS provider, service transaction number, type of service, and/or time to live (TTL) as well as specific parameters associated with a specific service such as a payment amount for a purchase and seller identification. The time to live (TTL) component that regenerates, rotates, and/or otherwise expires after a predetermined period of time.

Transaction: A transaction in respect to a token is the transmission event where the token is delivered from a first computational device to a second computational device. A transaction may involve the exchange of tokens between the two devices. For example, the exchange of a payment demand token may be followed by the return of a US dollar denominated cash or cash equivalent redeemable payment token.

Transaction Type: The function of the token transmission defines its type which in turn impacts its data structure. For example, a payment type token serves the function of consummating the purchase of a related good or service.

With one aspect, privacy protection is provided by masking the identity attributes of the end user through the means of transaction tokens. This may be achieved by assuring all identity attributes exposed by the transaction reference only the identity of the privacy service broker. The privacy service broker provides all the activities and services necessary to complete the transaction type represented by the token.

Identity Attribute: One or more identifiers presented by the device's physical existence including the identifiers used to bind the device, physically or logically, to any telecommunication, local or remote network as well as those enabling device to device (for example, Bluetooth) communication and includes the identifiers associating the device with the individual possessing the device.

Privacy Service Provider (Provider): The entity that implements the patent and owns and manages the protected device.

End User (PPS user): The individual who takes possession of the device and whose identity is strongly bound to the device (for example, only the end user may activate the device or its applications).

These and other features are described in further detail below.

FIG. 1 depicts an illustrative computing environment for supporting privacy as a service (PaaS) in accordance with one or more example embodiments.

Referring to FIG. 1, computing environment 100 may include one or more computer systems. For example, computing environment 100 may include privacy provider service (PPS) computing system 102, computing device 103, and PPS user device 104.

As described further below, PPS computing system 102 may be a computer system that includes one or more computing devices (for example, servers, server blades, or the like) and/or other computer components (for example, processors, memories, communication interfaces) that may be used to establish, modify, and maintain distributed ledgers for identity protection in event processing. PPS computing system 102 may comprise one or more computer servers and/or computing facilities providing cloud computing services.

Computing device 103 may be a laptop computer, desktop computer, mobile device, tablet, smartphone, server, and/or other device that may be used by a vendor to process an event (for example, execute a transaction or other event). In some instances, computing device 103 may provide one or more transaction services for a PPS user or a device interacting with PPS device 104. Although a single device 103 is illustrated, any number of computing device may be implemented without departing from the scope of the disclosure.

Figure 5:
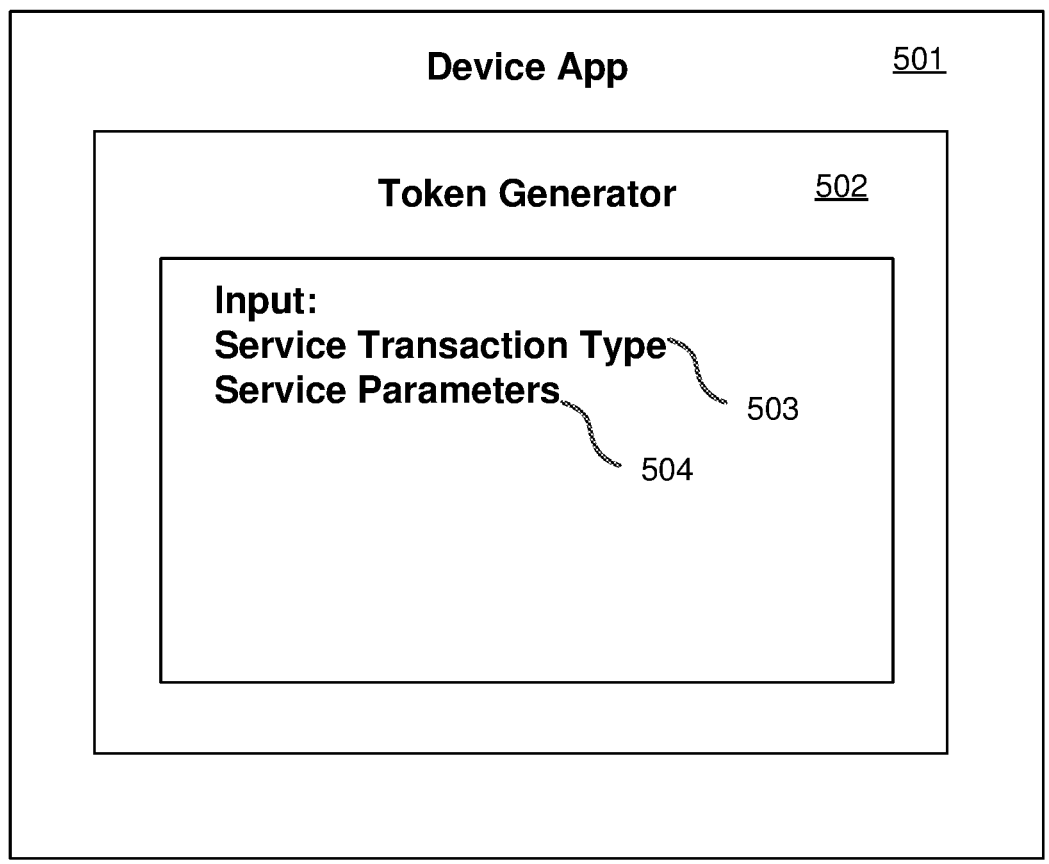
FIG. 5 depicts an application that may be executed by a PPS user device in accordance with one or more example embodiments.

PPS user device 104 may be a laptop computer, desktop computer, mobile device, tablet, smartphone, wearable device, and/or other device that may be used by an individual to request event processing. PPS user device 104 may interact with PPS provider computing platform 102 to support one or more PPS services. In some instances, user device 104 may execute a PPS provider application (for example, application 501 as shown in FIG. 5) to generate a token when supporting the PPS service.

Computing environment 100 also may include one or more networks, which may interconnect PPS computing system 102, computing device 103, and/or user device 104. For example, computing environment 100 may include a network 101, which may comprise telecom wireless facilities, near-field communication (NFC) channels, short-range wireless communication channels (for example, utilizing Bluetooth® technology), wide area networks, and/or local area networks.

In one or more arrangements, PPS computing system 102, computing device 103, and/or PPS user device 104 may be any type of computing device capable of sending and/or receiving requests and processing the requests accordingly. For example, PPS computing system 102, computing device 103, PPS user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of PPS computing system 102, computing device 103, and/or PPS user device 104 may, in some instances, be special-purpose computing devices configured to perform specific functions.

Figure 2:
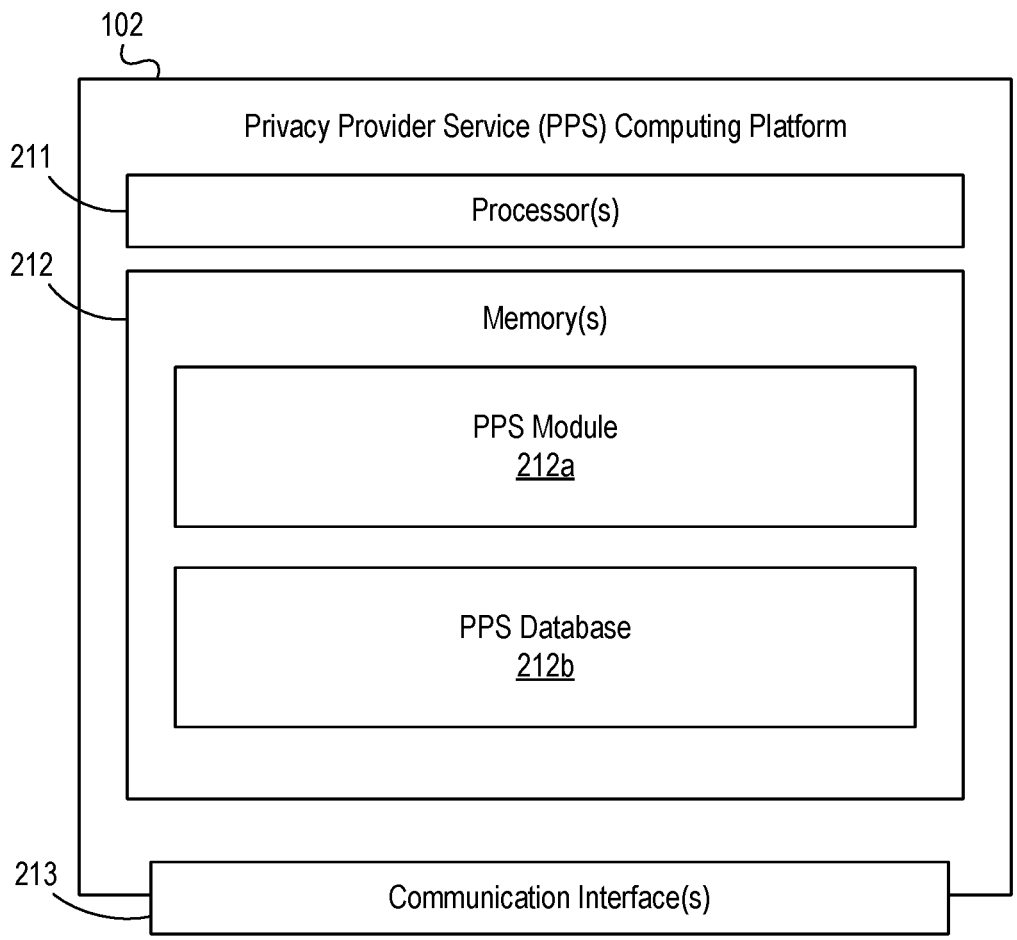
FIG. 2 depicts a privacy provider service (PPS) computing platform in accordance with one or more example embodiments.

FIG. 2 depicts a privacy provider service (PPS) computing platform 102 in accordance with one or more example embodiments.

PSS computing platform 102 may include one or more processors 211, memory 212, and communication interface 213. A data bus may interconnect processor 211, memory 212, and communication interface 213. Communication interface 213 may be a network interface configured to support communication between PPS computing platform 102 and one or more networks (for example, network 101, or the like). Memory 212 may include one or more program modules having instructions that when executed by processor 211 cause PPS computing platform 102 to perform one or more functions described herein and/or one or more databases that may store and/or otherwise maintain information which may be used by such program modules and/or processor 211. In some instances, the one or more program modules and/or databases may be stored by and/or maintained in different memory units of PPS computing platform 102 and/or by different computing devices that may form and/or otherwise make up PPS computing platform 102. For example, memory 212 may have, host, store, and/or include PPS module 212a and/or PPS database 212b.

PPS module 212a may have instructions that direct and/or cause PPS computing platform 102 to support service transactions as discussed in greater detail below. PPS database 212b may store information used by PPS module 212a and/or PPS computing platform 102 in application of advanced techniques to support service transactions and/or in performing other functions.

Figure 3:
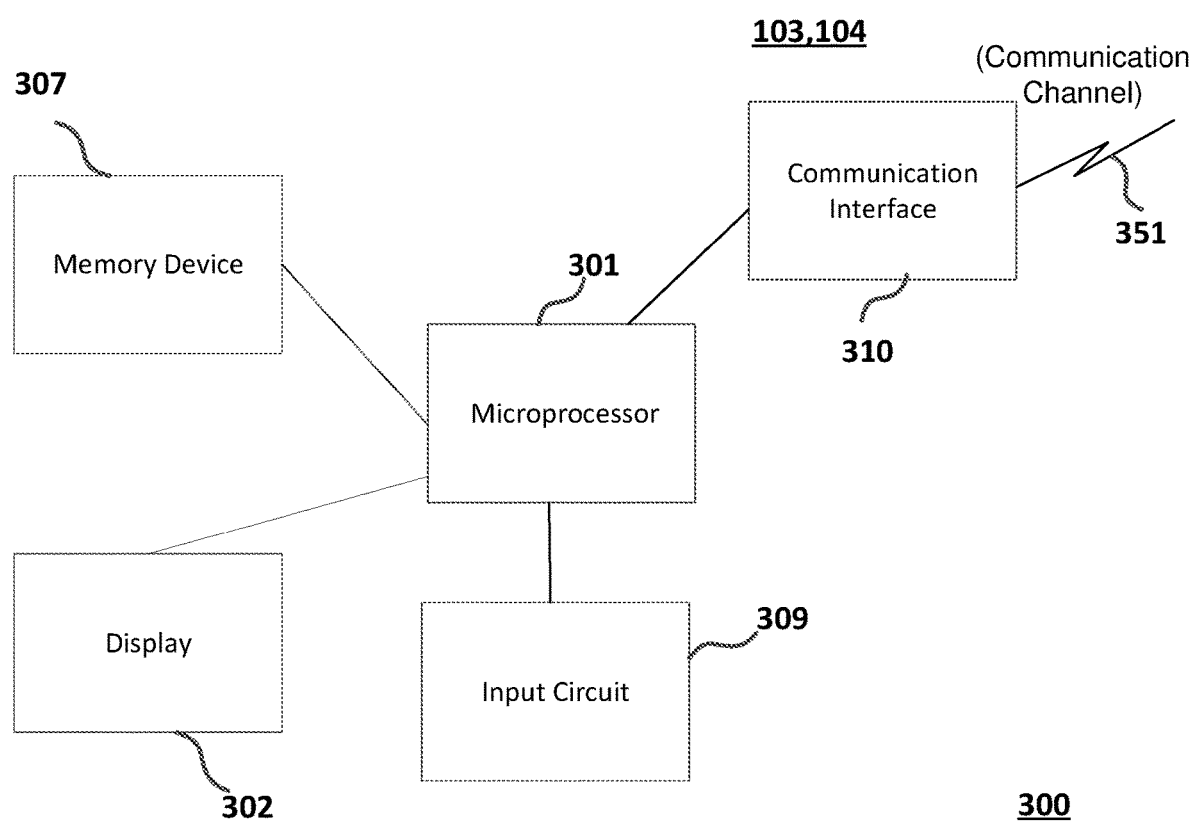
FIG. 3 depicts a device that interacts with a PPS computing platform in accordance with one or more example embodiments.

FIG. 3 depicts apparatus 300 for supporting device 103, 104 (as shown in FIG. 1) that interacts with PPS computing platform 102 in accordance with one or more example embodiments.

Processor 301 interacts with communications interface 310 to communicate with other devices via communication channel 351 to support event sequences shown in FIGS. 6-11. Communication channel 351 may assume different types of channel, including but not limited to near-field communication (NFC) channels and short-range wireless communication channels (for example, utilizing Bluetooth® technology).

With reference to FIG. 3, a computing system environment may include a computing device where the processes (for example, process 400 shown in FIG. 4) discussed herein may be implemented. The computing device may include processor 301 for controlling overall operation of the computing device and its associated components, including RAM, ROM, communications module, and memory device 307. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With some embodiments, processor 301 may execute computer-executable instructions stored at memory 307.

With some embodiments, memory devices 307 may be physically implemented within a single memory device.

Apparatus 300 may also include input circuit 309 (for example, touch screen or keypad) enabling a user to input information about service parameters regarding service transactions so that tokens may be generated and transmitted. Apparatus 300 may also support display 302 so that information (for example, notifications) may be displayed to the user.

Figure 4:
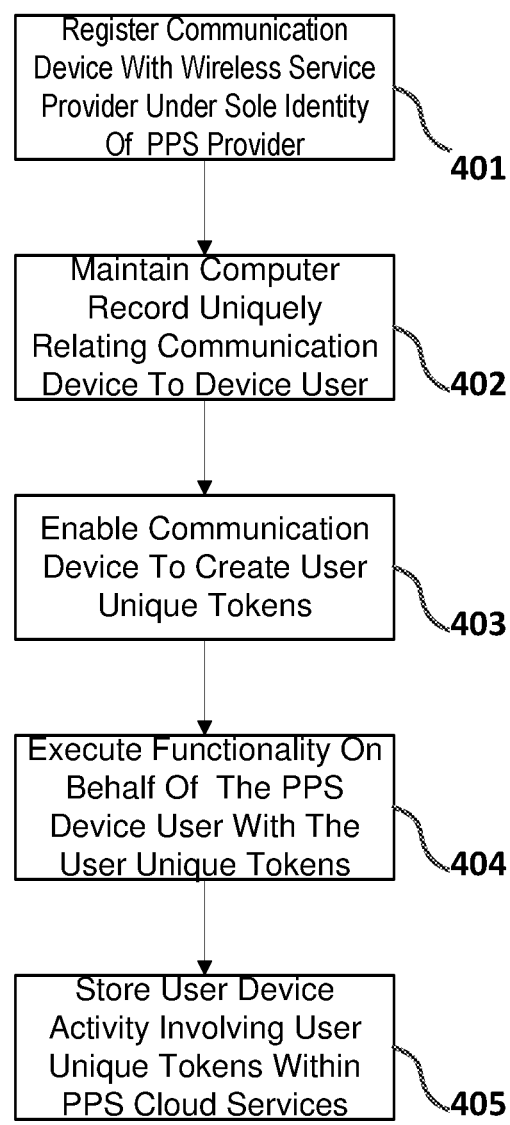
FIG. 4 depicts a flowchart that a PPS computing platform may execute in accordance with one or more example embodiments.

FIG. 4 depicts a flowchart 400 for a process that a PPS computing platform may execute to support a service transaction in accordance with one or more example embodiments.

Support of the embodiments may begin with the acquisition and provisioning of the mobile device (referred to as the PPS user's device) to be possessed by the PPS user protected by the PPS service provider. The PPS provider purchases a computing device and records all related purchase related information as required by the device manufacture or vendor based on the PPS provider's identity. The PPS provider may enable various wireless services available on the device with telecom carriers and internet service providers in the PPS provider's name.

The PPS provider may then install proprietary software (for example, an application) to enable the creation of transaction tokens and the execution of transactions. The PPS provider's software prepares the device by enabling or disabling services made available by the device's native operating system. The PPS provider's software may bind the device to the PPS provider's cloud computing services (which may be performed by PPS computing platform 102), where no change may be permissible to the software present on the device without the PPS provider's authorization.

The PPS provider's software may enable the end user (PPS user) to request software from an approved library of software to assure identity protection when in use on the device. The PPS provider may be responsible for enabling every identity protected transaction available on the device by composing, configuring or encapsulating the installed software. An example is disabling GPS location services relative to the application while enabling that information to be consumed exclusively by the PPS provider. The device manufacturer should comply with the demands of the PPS provider to secure the identifiers emanating from the device or the device may not be made available to the PPS user (in other words, no manufacturer back doors). The PPS provider delivers the device to the PPS user and exclusively maintains usage and accounting records regarding who received possession of the device and the source of resources used to pay for services arising out of device use. The PPS provider may implement strong multi-factor authentication binding the device to a single end user such that only that user can activate the device.

Referring to FIG. 4, at step 401, PPS computing platform 102 registers wireless communication device 104 with a wireless service provider under the sole identity of the PPS provider on behalf of an undisclosed device user enabling anonymity for the PPS user.

At step 402, PPS computing platform 102 maintains at least one computer record uniquely relating the device to the PPS user including the device phone number assigned by the wireless service provider and a universally unique identifier assigned to the device user.

At step 403, PPS computing platform 102 enables the PPS device to create user unique tokens digitally signed by the PPS provider that are used to execute functionality in step 404 as enabled by the device's installed software combined with PPS cloud services under the sole identity of the PPS provider.

In step 405, PPS computing platform 102 stores user device activity involving tokens within the PPS cloud services mapping the PPS device and the activity to the user's identity and enabling the PPS computing platform to fully execute the functionality on behalf of the user.

FIG. 5 depicts application 501 that may be executed by PPS user device 104 in accordance with one or more example embodiments.

When PPS user possesses PPS device 104 from the PPS provider, the PPS user may consume the provider's identity protection services through one or more transaction enabled software applications (for example, application 501) that implements token creation and transmission. The provider's software may encapsulate or replace third party application software as needed to enable transaction-based application flows.

Referring to FIG. 5, application 501 includes token generator 501 to generate a token needed for supporting service transaction according to inputted information from the PPS user such as service transaction type 502 and service parameters 503. For example, service transaction types 502 may include payment transfer services and communications services. Service parameters 503 may include a payment amount or communication mode for payment transfer services and communications services, respectively.

As will be discussed with FIGS. 6-11, a PPS provider's encapsulating or replacement software enables the consumption of a particular type of application service on PPS device 104.

Figure 6:
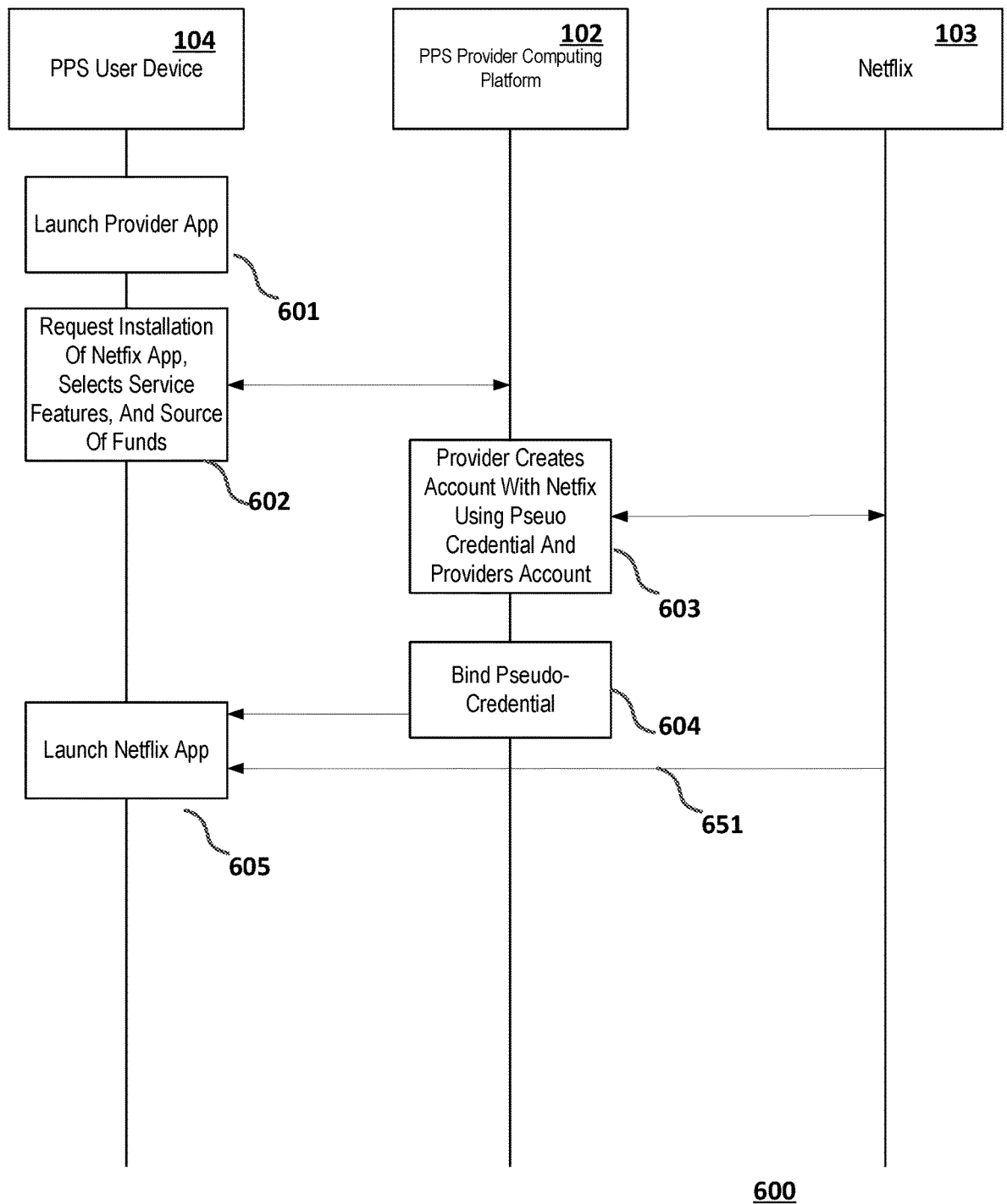
FIG. 6 depicts an illustrative event sequence for the consumption of internet application services in accordance with one or more example embodiments.

FIG. 6 depicts illustrative event sequence 600 for the consumption of internet application services (for example, content streaming services such as Netflix) in accordance with one or more example embodiments.

PPS computing platform 102 may maintain user accounts for any website that the user chooses to visit or belong to under an anonymous token issued by the PPS provider and scoped to the website. Upon browsing to a website from the PPS device, the login authentication to that website may be brokered by PPS computing platform 102. Only PPS computing platform 102 knows the required credentials and can provide randomized password changes at randomized intervals on the account that represents the PPS user.

It may be possible for one PPS website account to be reused over time across many users of a given PPS provider during exclusive website session instances. The PPS provider may maintain enough accounts with each website to service the demand from its user population.

PPS computing platform 102 may possess the necessary information to consummate purchases on behalf of its device users and arrange anonymous physical delivery channels post purchase. This approach further enhances anonymity in transacting while preserving user privacy.

Abstracting the ownership and possession of a mobile device from the user's identity shields the user from the capture and storing of personally identifiable information by all other parties involved in the data communication flow arising out of that device. Only the user's selected and trusted PPS provider has visibility into the user's identity.

Referring to FIG. 6, at step 601, PPS device 104 launches provider application. At step 602, the PPS user, via device 104, requests PPS computing platform 602 to install the Netflix application for use on PPS device 104, selects service features to be installed, and directs the PPS provider to a selected source of funds to reimburse the PPS provider for Netflix payments made on PPS user's behalf.

At step 603, PPS computing platform 102 creates an account with Netflix computing platform 103 using a pseudo-credential and subscribes to the Netflix service supplying the PPS provider's account for charging monthly payments.

At step 604, PPS computing platform 102 binds the pseudo-credential to the Netflix application on PPS device 104 so that when the Netflix application launches at step 605, the pseudo-credential is provided and streaming content 651 is accessible on device 104.

Figure 7:
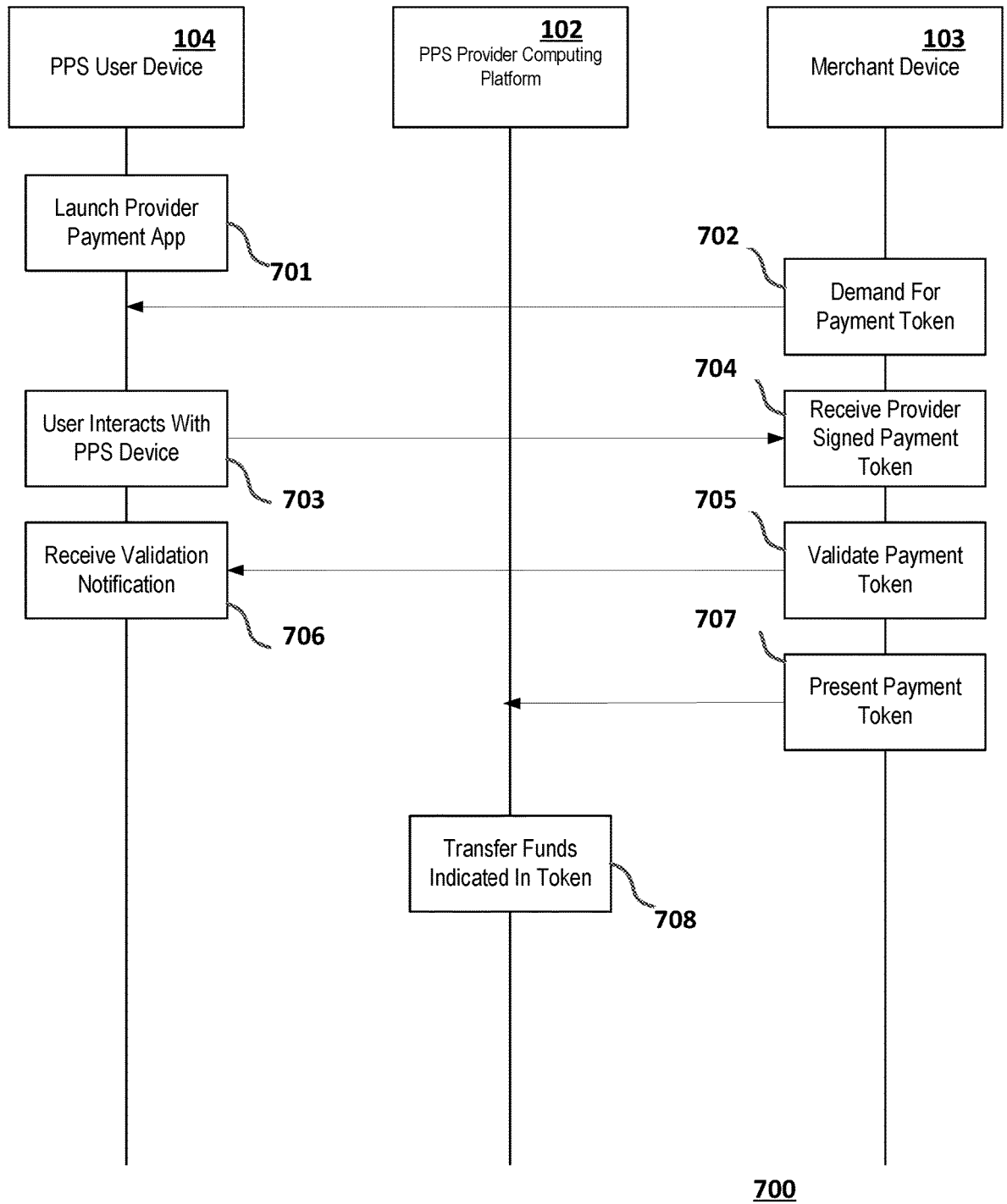
FIG. 7 depicts an illustrative event sequence for the consumption of person to merchant payment services in accordance with one or more example embodiments.

FIG. 7 depicts illustrative event sequence 700 for the consumption of person to merchant payment services in accordance with one or more example embodiments.

Payment services via the mobile device 104 follow a similar pattern of token enablement and authentication. The mobile device's user's payment sources may be bound to the device anonymously and upon emitting a payment token the appropriately selected user resource is evaluated for funding and if funds are available the payment is made anonymously in the form of a cash equivalent token. The PPS provider may also be the source of the funding resource based on direct access to the user's accounts or be authorized to broker the funding on behalf of the device user's designated financial institution. The PPS guaranteed cash equivalent token may be disbursed over the appropriate channel to the payee.

Referring to FIG. 7, at step 701 PPS device 104 launches PPS provider installed payment application in response to placing device 104 in near-field proximity of merchant device 103.

At step 702, merchant device 103 transmits a "demand for payment" token representing a bill of sale that identifies items to be purchased, associated taxes and charges, and total amount due. At step 703, PPS user, via device 104, interacts with the device via screen touch, physical button or voice command agreeing to make payment for the requested amount and places the device in near-field proximity of merchant device 103 causing a provider signed payment token to be transmitted to the merchant device at step 704. The token is indicative of the amount requested and guaranteed redeemable upon presentment to the PPS provider.

At step 705, merchant device 103 validates authenticity of the token via its signature and accepts the authenticated token as payment or rejects it for lack of authentication. At step 706, merchant device 103 notifies PPS user's device of acceptance or rejection, which is displayed on the screens of both users.

On acceptance the PPS user receives title and possession of the items and on rejection title and possession remains with the merchant.

At step 706, merchant device 103 presents the token to PPS provider computing platform 102, designating merchant's financial institution and account to receive the payment. The PPS provider subsequently transfers the token denominated currency based on the token's face value to the merchant's designated account, for example via ACH or wire.

Figure 8:
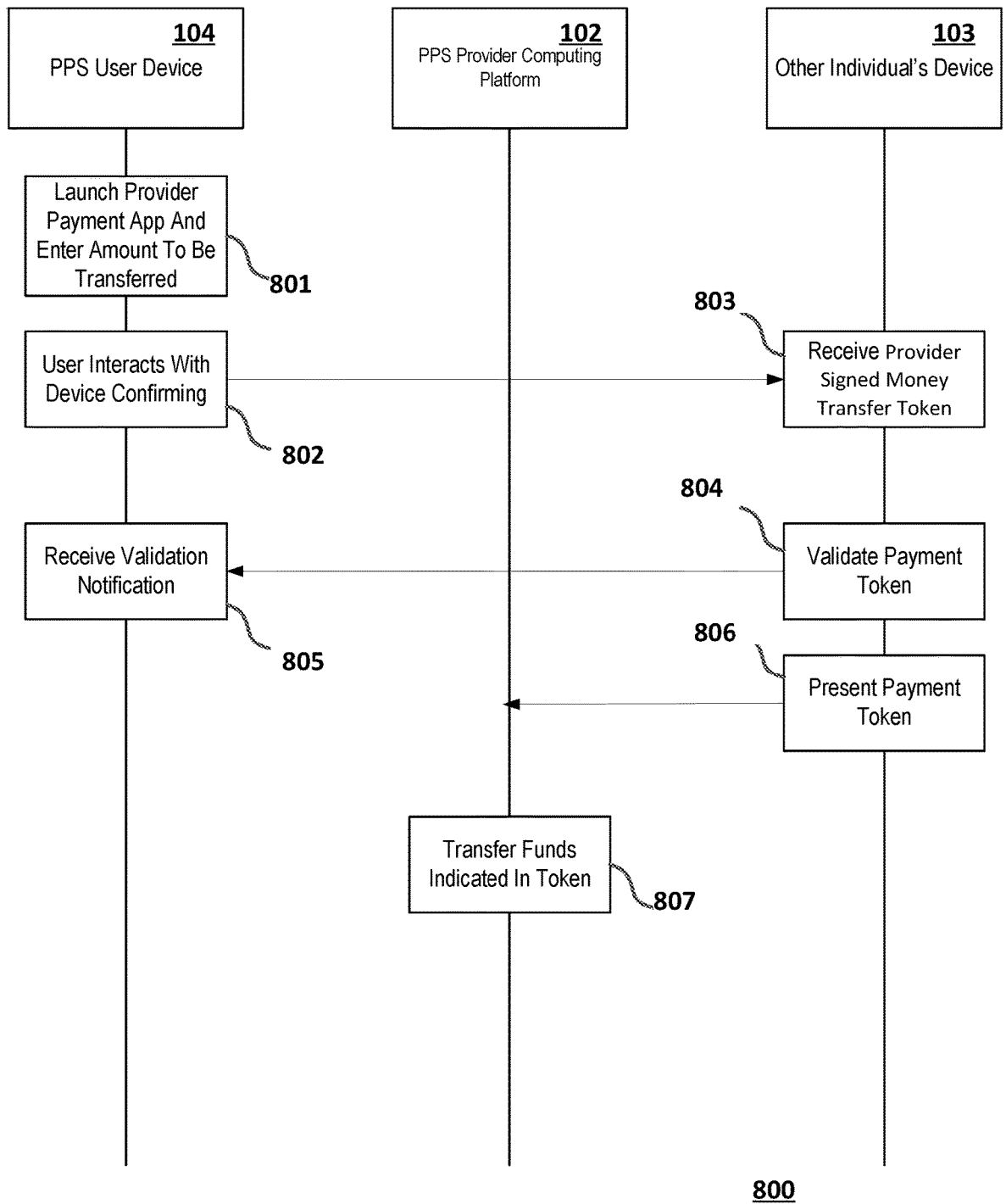
FIG. 8 depicts an illustrative event sequence for the consumption of person to person money transfer services in accordance with one or more example embodiments.

FIG. 8 depicts illustrative event sequence 800 for the consumption of person to person money transfer services in accordance with one or more example embodiments.

At step 801, PPS device 104 launches PPS provider installed payment application and enters the amount to be transferred. At step 802, the PPS user interacts with PPS device 104 via screen touch, physical button or voice command confirming transfer amount then places the device in near-field proximity of the other individual's device causing a provider signed money transfer token to be transferred at step 803. The token is indicative of the amount, guaranteed redeemable upon presentment to the PPS provider.

At step 804, device 103 validates authenticity of the token via its signature and accepts the authenticated token or rejects it for lack of authentication. At step 805, device 103 notifies PPS user's device 104 of acceptance or rejection which is displayed on the screens of both users.

At step 806, on acceptance the other person's device 103 presents the token to PPS provider computing platform 102, designating the other person's financial institution and account to receive the transfer. The PPS provider subsequently transfers the token denominated currency based on the token's face value to the designated account, for example via ACH or wire.

Figure 9:
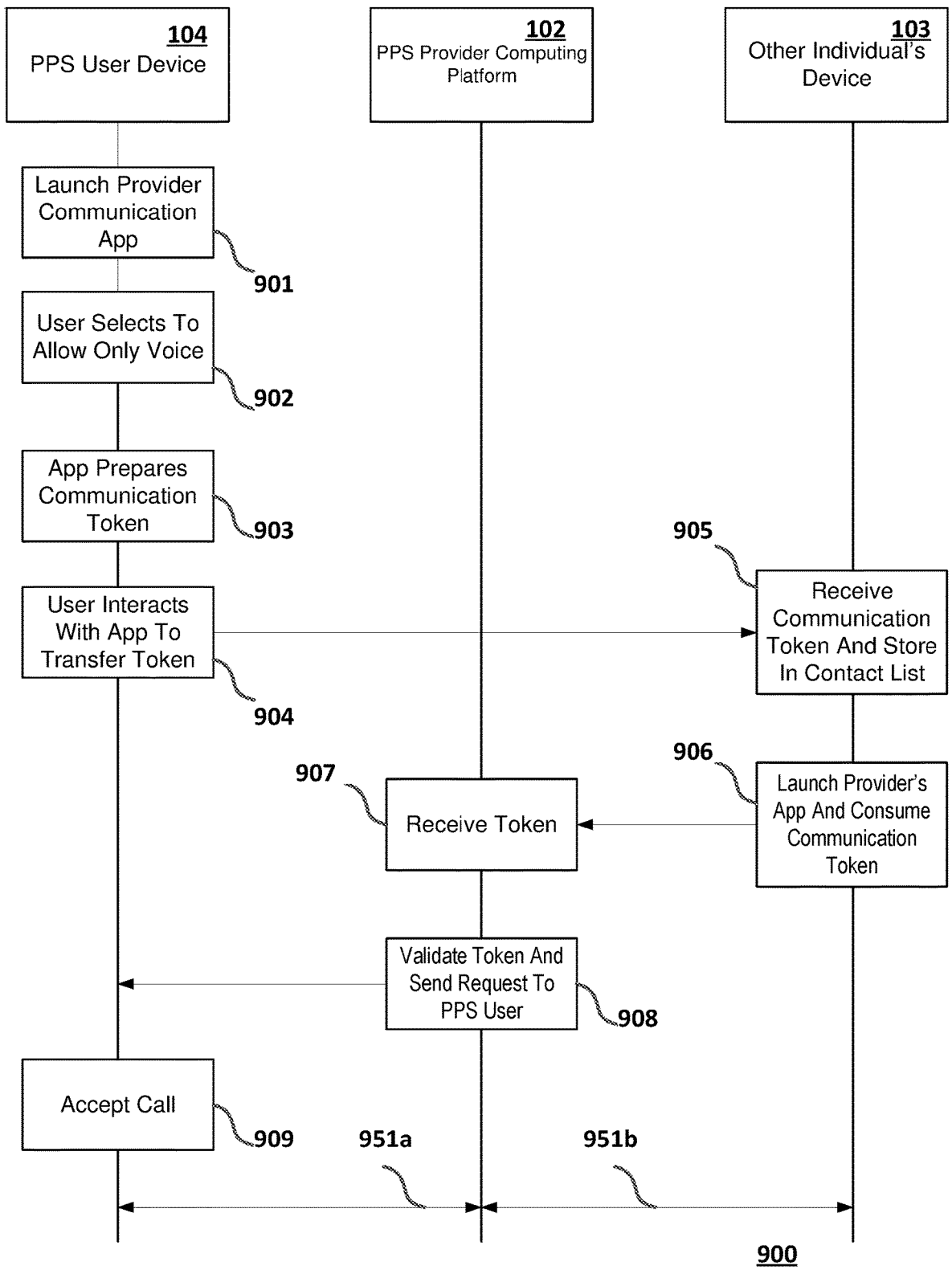
FIG. 9 depicts an illustrative event sequence for the consumption of voice communication services in accordance with one or more example embodiments.

FIG. 9 depicts illustrative event sequence 900 for the consumption of voice communication services in accordance with one or more example embodiments.

With one aspect of the embodiments, all communication end points (for example, phone number from the telecom assigned to a user's device, e-mail address, and the like) may be referenced by a token placed in the calling device user's contact list. To be able to initiate a call to the PPS user, the caller must first obtain a contact token from the party (PPS user) to be called. The contact token authorizes the caller to call the PPS user.

Referring to FIG. 9, PPS provider installed software encapsulates or replaces the device's native communication application and manipulates that software to enable token implemented management of the various communication features. Consequently, there is no direct access to the device's native communication software.

At step 901, PPS device 104 launches the PPS provider's application (app) to compose a communication token. At step 902, PPS user, via the application, selects to allow voice but not text communication. At step 903, the application prepares a communication token prescribing the allowed voice communication channel.

At step 904, the PPS user interacts with PPS device 104 via screen touch, physical button or voice command confirming transfer then places device 104 in near-field proximity of the other individual's device 103 causing the prepared communication token to be transmitted to the other individual's device 103. At step 905, the other individual's device 103 receives the token and stores it in their device's contact's list application under the label exposed on the token, for example, the end user's chosen pseudo name\nick name. The token is signed by the PPS provider enabling the other user to consume the token by contacting the PPS provider to activate a voice call.

To initiate a voice communication the calling user clicks on the pseudo name in their device's contact list. At step 906, using the token's identified PPS provider, the caller's device 103 locates and installs the PPS provider's application if not already installed. The PPS provider's application is launched and consumes the contact token by first checking whether the token is still valid and not revoked by connecting to the PPS provider's cloud service and submitting the token at step 907.

If the token is still valid, at step 908, the PPS provider notifies the end user's (PPS user's) device that a call was requested and supplies the information regarding the caller stored with the PPS provider and within the end user's contact list. At step 909, if the end user does not refuse the call, PPS provider computing platform 102 selects a communication channel such as a telecom wireless line or an IP packet-based end-point connection.

If the selected channel is a telecom wireless line, the PPS provider platform 102 configures conference line 951a,b, calls PPS device 104, and initiates caller's device 103 to connect the devices to the conference line, thus masking the phone numbers associated with the devices of the respective parties from each other.

If the selected channel is an IP packet-based call, PPS provider platform 102 configures an IP conference line, joins the PPS device 104 and initiates caller's device 103 to that line, thus masking the IP identities associated with the devices of the respective parties from each other.

Figure 10:
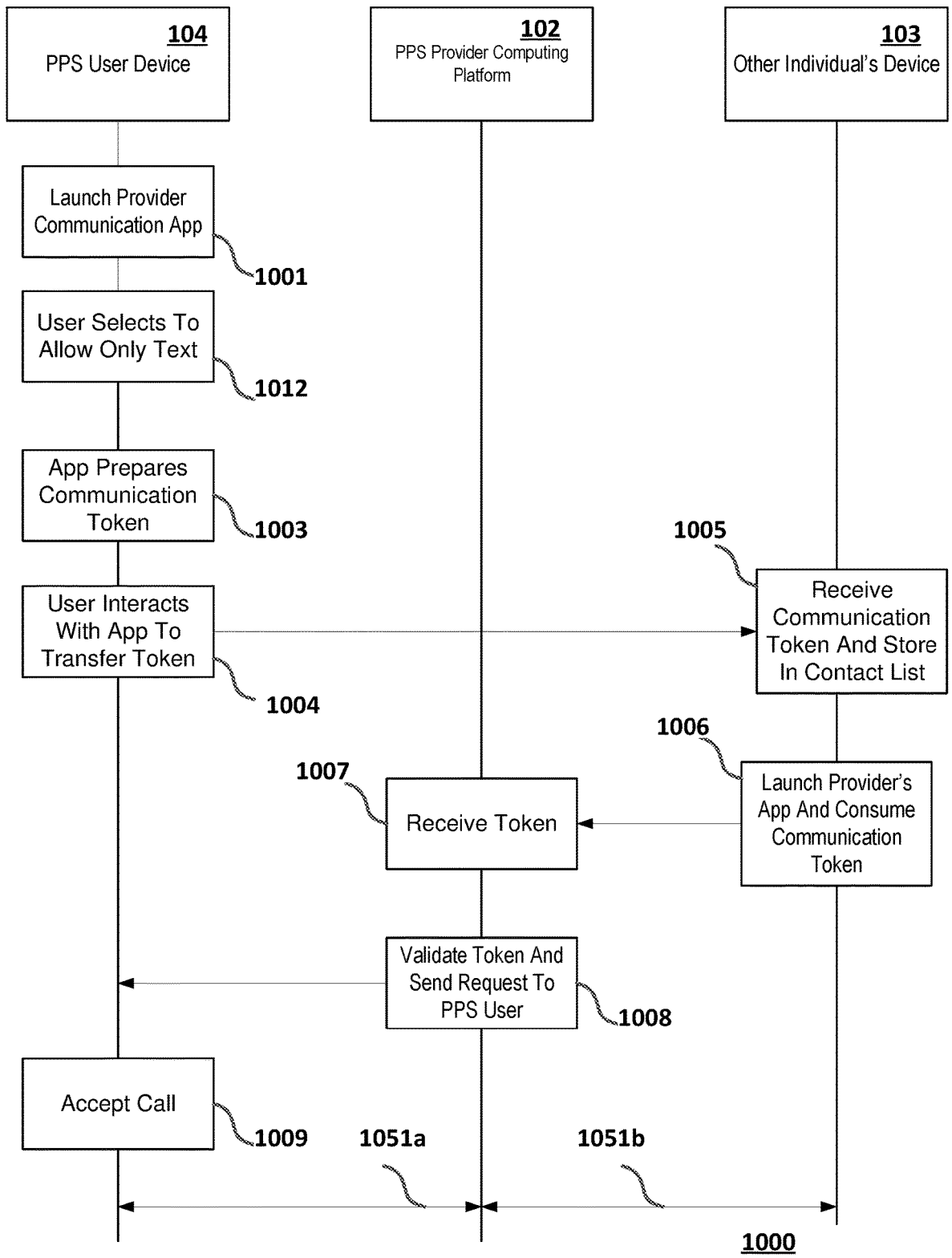
FIG. 10 depicts an illustrative event sequence for consumption of text communication services in accordance with one or more example embodiments.

FIG. 10 depicts illustrative event sequence 1000 for consumption of text communication services in accordance with one or more example embodiments. As with FIG. 9, PPS provider installed software encapsulates or replaces the end user's device's native communication application and manipulates that software to enable token implemented management of the various communication features. Consequently, there is no direct access to the device's native communication software.

At step 1001, PPS device 104 launches the PPS provider's application to compose a communication token. At step 1002, the PPS user, via the application, selects to allow text but not voice communication. At step 1003, the application prepares a communication token prescribing the allowed text communication channel.

At step 1004, the PPS user interacts with PPS device 104 via screen touch, physical button or voice command confirming transfer then places device 104 in near-field proximity of the other individual's device 103 causing the prepared communication token to be transmitted to the other individual's device 103. At step 1005, the other individual's device 103 receives the token and stores it in the device's contact's list application under the label exposed on the token, for example, the end user's chosen pseudo name\nickname. The token is signed by the PPS provider enabling the other user to consume the token by contacting the PPS provider to activate a text call.

To initiate a text communication the calling user clicks on the pseudo name in their device's contact list. At step 1006, using the token's identified PPS provider, the caller's device 103 locates and installs the PPS provider's application if not already installed. The PPS provider's application is launched and consumes the contact token by first checking that the token is still valid and not revoked by connecting to the PPS provider's cloud service and submitting the token at step 1007.

If the token is still valid, at step 1008, the PPS provider notifies the end user's device that a call was requested and supplies the information regarding the caller stored with the PPS provider and within the end user's contact list. At step 1009, if the end user does not refuse the call, PPS provider computing platform 102 selects a communication channel such as a telecom wireless line or an IP packet-based end-point connection.

If the selected channel is a telecom wireless line, the PPS provider platform 102 configures text line 1051a,b and relays the text messages between the parties over the channel, thus masking the phone number associated with the devices of the respective parties from each other.

If the selected channel is an IP packet-based call, the PPS provider platform 102 configures an IP based text channel, joins the end user, and initiates the text requestor relaying the text messages between the parties over that channel, thus masking the IP identities associated with the devices of the respective parties from each other.

Figure 11:
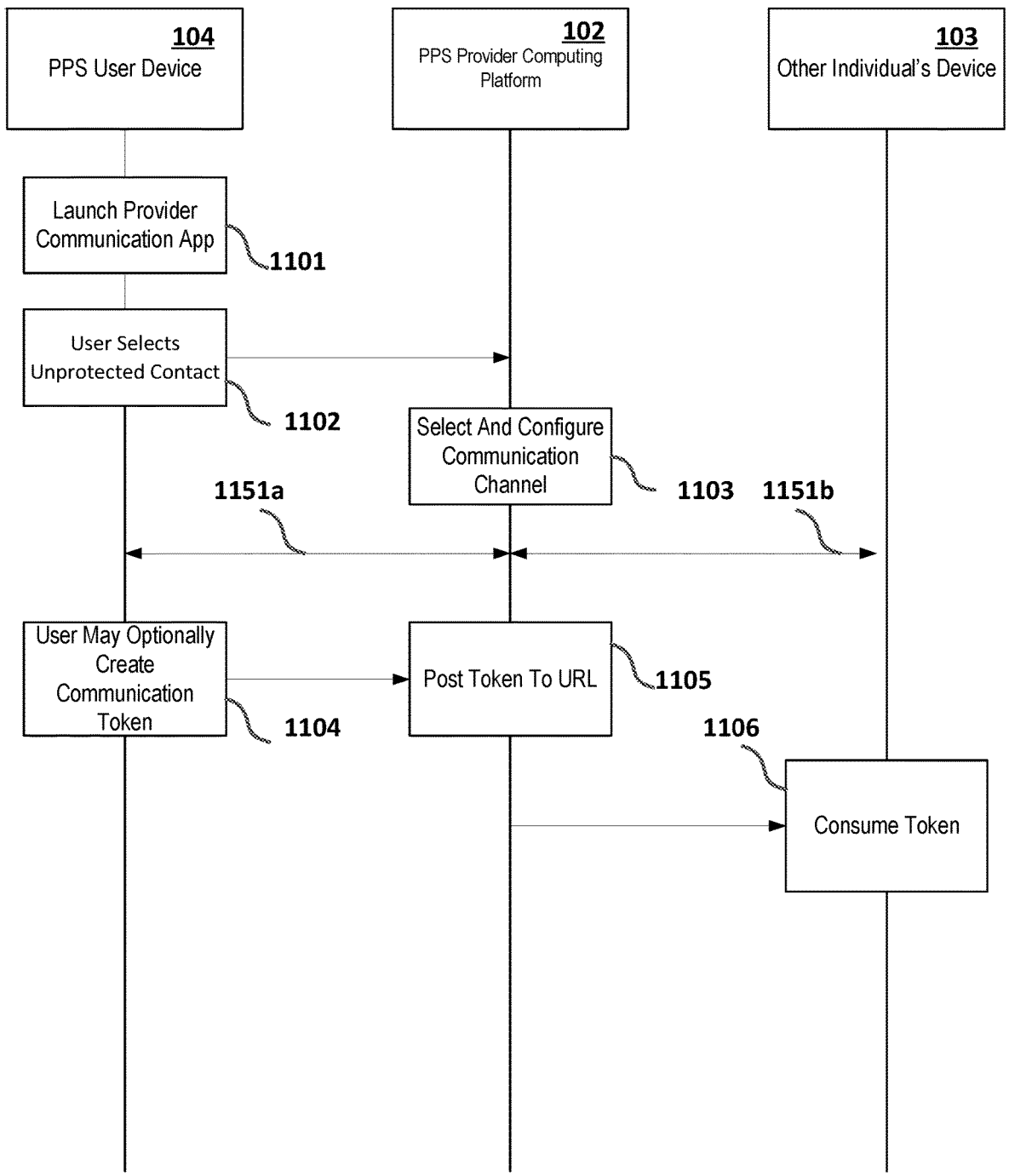
FIG. 11 depicts an illustrative event sequence for consumption of voice communication services in accordance with one or more example embodiments.

FIG. 11 depicts illustrative event sequence 1100 for consumption of voice communication services in accordance with one or more example embodiments. With sequence 1100, PPS device 104 calls device 103 at an unprotected, publicly published number.

As with FIGS. 9 and 10, provider installed software encapsulates or replaces the end user's device's native communication application and manipulates that software to enable token implemented management of the various communication features—there is no direct access to the device's native communication software.

At step 1101, PPS device 104 launches the PPS provider's application. At step 1102, the PPS user, via PPS device 104, selects an unprotected contact from their contact list which supplies the contact's publicly available phone number, copies and pastes the number from a text selection activity, or selects direct dial and types in the number.

At step 1103, the PPS provider's application selects a telecom wireless or IP communication channel and connects to one of the PPS provider's available conference lines. PPS provider computing platform 102 then calls the contact or manually entered phone number to join the conference line, thus masking the phone number or IP associated with the devices of the respective parties from each other.

At step 1104, if during the course of the call the unprotected party at device 103 desires permission to call PPS user at device 104 in the future, the PPS user may engage the PPS provider's application to compose a communication token. Subsequently the token is posted to a URL on the PPS provider's cloud service at step 1105 to be retrieved by the unprotected party (prior to the call ending at which time the URL will be deactivated). The unprotected party may need to install the PPS provider's token processing software to consume the token or add the token to their contact list at step 1106. If the unprotected party does not have a device compliant contact list application, the unprotected party may open a cloud service account with the PPS provider and store the token with the PPS provider. The unprotected party accesses the token by calling the PPS provider's cloud service via the PPS provider application downloaded to unprotected party's device 103.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (for example, air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (for example, a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform enabling a privacy provider service (PPS) to protect a user's identity during use of a communication device, the computing platform comprising:
   at least one processor; and
   a communication interface communicatively coupled to the processor; and
   memory storing computer-readable instructions that, when executed by the processor, cause the computing platform to:
      register the communication device with a wireless service provider under a sole identity and ownership of a PPS provider on behalf of a PPS device user enabling anonymity for the PPS device user, registering the communication device under the sole identity of the PPS provider breaks a connection between an identity of the PPS device user and an identifier of the communication device to entities other than the PPS provider and further includes registering a chip associated with the communication device in a name of the PPS provider and implementing a service plan executed by the PPS provider, and wherein the PPS device user is undisclosed to entities providing goods and services to the PPS device user;
      maintain at least one computer record uniquely relating the communication device to the PPS device user including a device telephone number assigned by the wireless service provider and a universally unique identifier assigned to the PPS device user;
      enable the communication device to create user unique tokens digitally signed by the PPS provider that are used to execute functionality enabled by installed software on the communication device combined with PPS cloud services under sole identity of the PPS provider;
      execute the functionality on behalf of the PPS device user using the user unique tokens in conjunction with PPS cloud services; and
      store user device activity involving the user unique tokens within the PPS cloud services mapping the communication device and transaction activity to the user's identity and enabling the PPS provider to fully execute the functionality on behalf of the PPS device user.

2. The computing platform of claim 1, wherein the functionality supports internet application services with an internet provider and wherein the memory storing computer-readable instructions that, when executed by the processor, further cause the computing platform to:
   initiate installation of an internet services app based on selected service features on the communication device;
   receive an indicator indicative of a selected source of funds for reimbursing the PPS provider for streaming content;
   creating an account subscription for the communication device with the internet provider with a pseudo-credential, wherein the account subscription is based on an account of the PPS provider; and
   binding the pseudo-credential to the internet services app, wherein the internet services app executes on the communication device to access streaming content.

3. The computing platform of claim 1, wherein the functionality supports payment services with a merchant and wherein the memory storing computer-readable instructions that, when executed by the processor, further cause the computing platform to:

generate a payment token signed by the PPS provider for a requested amount, wherein the requested amount is guaranteed redeemable upon presentation to the PPS provider;
receive the payment token from a merchant device of the merchant;
validate a signature of the PPS provider of the payment token based on the signature of the PPS provider; and
in response to the validation, initiate transfer of the requested amount into a designated account.

4. The computing platform of claim 1, wherein the functionality supports person to person money transfer services from the PPS device user to another individual and wherein the memory storing computer-readable instructions that, when executed by the processor, further cause the computing platform to:
generate a payment token signed by the PPS provider for a requested amount, wherein the requested amount is guaranteed redeemable upon presentation to the PPS provider;
receive the payment token from another device of another individual;
validate a signature of the PPS provider of the payment token based on the signature of the PPS provider; and
in response to the validation, initiate transfer of the requested amount into a designated account.

5. The computing platform of claim 1, wherein the functionality supports voice communication services for the PPS device user and wherein the memory storing computer-readable instructions that, when executed by the processor, further cause the computing platform to:
receive a communication token from a caller's device to initiate a requested call to the PPS device user, wherein the communication token includes the universally unique identifier assigned to the PPS device user and is indicative of voice mode communication only;
when the communication token is valid, notify the PPS device user about the requested call and information about a caller;
when the call request is accepted by the PPS device user, selecting a communication channel; and
conference the communication device and the caller's device via the selected communication channel, wherein identification information of the communication device and the caller's device is masked.

6. The computing platform of claim 5, wherein the memory storing computer-readable instructions that, when executed by the processor, further cause the computing platform to:
when the selected communication channel comprises a telecom wireless line, mask telephone numbers associated with both devices.

7. The computing platform of claim 5, wherein the memory storing computer-readable instructions that, when executed by the processor, further cause the computing platform to:
when the selected communication channel comprises an IP packet-based connection, mask IP addresses associated with both devices.

8. The computing platform of claim 1, wherein the functionality supports text communication services for the PPS device user and wherein the memory storing computer-readable instructions that, when executed by the processor, further cause the computing platform to:
receive a communication token from a caller's device to initiate a requested call to the PPS device user, wherein the communication token includes the universally unique identifier assigned to the PPS device user and is indicative of text mode communication only;
when the communication token is valid, notify the PPS device user about the requested call and information about the caller;
when the call request is accepted by the PPS device user, configure a text line to the communication device and to the caller's device; and
relaying at least one text message between the communication device and the caller's device, wherein identification information of the communication device and the caller's device is masked.

9. The computing platform of claim 1, wherein the functionality supports communication services for the PPS device user calling another device having an unprotected, publicly published telephone number and wherein the memory storing computer-readable instructions that, when executed by the processor, further cause the computing platform to:
receive, from the PPS device user, a request to call a publicly available telephone number; and
configure a conference line with the communication device and the other device to establish a call, wherein masking identification associated with the communication device and the other device.

10. The computing platform of claim 7, wherein the functionality supports communication services for the PPS device user calling another device having an unprotected, publicly published telephone number and wherein the memory storing computer-readable instructions that, when executed by the processor, further cause the computing platform to:
receive, from the PPS device user prior to the call ending, a communication token;
post the communication token on a cloud service of the PPS provider at a web address; and
when the communication token is retrieved by the other device, deactivate the web address.

11. The computing platform of claim 10, wherein the functionality supports communication services for the PPS device user calling another device having an unprotected, publicly published telephone number and wherein the memory storing computer-readable instructions that, when executed by the processor, further cause the computing platform to:
send, to the other device, the communication token; and
subsequently receive, from the other device, the communication token to establish a subsequent call; and
conference the communication device and the caller's device via the selected communication channel, wherein identification information of the communication device and the caller's device is masked.

12. A computer-implemented method for enabling a privacy provider service (PPS) to protect a user's identity during use of a communication device, comprising:
registering, by a computing platform having at least one processor and memory, the communication device with a wireless service provider under a sole identity and ownership of a PPS provider on behalf of a PPS device user enabling anonymity for the PPS device user, registering the communication device under the sole identity of the PPS provider breaks a connection between an identity of the PPS device user and an identifier of the communication device to entities other than the PPS provider and further includes registering a chip associated with the communication device in a name of the PPS provider and implementing a service plan executed by the PPS provider, and wherein the PPS device user is undisclosed to entities providing goods and services to the PPS device user;

maintaining, by the at least one processor, at least one computer record uniquely relating the communication device to the PPS device user including a device telephone number assigned by the wireless service provider and a universally unique identifier assigned to the PPS device user;

enabling, by the at least one processor, the communication device to create user unique tokens digitally signed by the PPS provider that are used to execute functionality enabled by installed software on the communication device combined with PPS cloud services under sole identity of the PPS provider;

executing, by the at least one processor, the functionality on behalf of the PPS device user using the user unique tokens in conjunction with PPS cloud services; and storing, by the at least one processor, user device activity involving the user unique tokens within the PPS cloud services mapping the communication device and transaction activity to the PPS device user's identity and enabling the PPS provider to fully execute the functionality on behalf of the PPS device user.

13. The method of claim 12, wherein the functionality supports internet application services with an internet provider and the method further including:

initiating, by the at least one processor, installation of an internet services app based on selected service features on the communication device;

receiving, by the at least one processor, an indicator indicative of a selected source of funds for reimbursing the PPS provider for streaming content;

creating, by the at least one processor, an account subscription for the communication device with the internet provider with a pseudo-credential, wherein the account subscription is based on an account of the PPS provider; and binding, by the at least one processor, the pseudo-credential to the internet services app, wherein the internet services app executes on the communication device to access streaming content.

14. The method of claim 12, wherein the functionality supports payment services with a merchant and the method further including:

generating a payment token signed by the PPS provider for a requested amount, wherein the requested amount is guaranteed redeemable upon presentation to the PPS provider;

receiving the payment token from a merchant device of the merchant;

validating a signature of the PPS provider of the payment token based on the signature of the PPS provider; and in response to the validation, initiating transfer of the requested amount into a designated account.

15. The method of claim 12, wherein the functionality supports person to person money transfer services from the PPS device user to another individual and the method further including:

generating a payment token signed by the PPS provider for a requested amount, wherein the requested amount is guaranteed redeemable upon presentation to the PPS provider;

receiving the payment token from another device of another individual;

validating a signature of the PPS provider of the payment token based on the signature of the PPS provider; and in response to the validation, initiating transfer of the requested amount into a designated account.

16. One or more non-transitory computer-readable media storing instructions that, when executed by a computing platform comprising at least one processor, memory, and a communication interface, cause the computing platform to:

register a communication device with a wireless service provider under a sole identity and ownership of a PPS provider on behalf of a PPS device user enabling anonymity for the PPS device user, registering the communication device under the sole identity of the PPS provider breaks a connection between an identity of the PPS device user and an identifier of the communication device to entities other than the PPS provider and further includes registering a chip associated with the communication device in a name of the PPS provider and implementing a service plan executed by the PPS provider, and wherein the PPS device user is undisclosed to entities providing goods and services to the PPS device user;

maintain at least one computer record uniquely relating the communication device to the PPS device user including a device telephone number assigned by the wireless service provider and a universally unique identifier assigned to the PPS device user;

enable the communication device to create user unique tokens digitally signed by the PPS provider that are used to execute functionality enabled by installed software on the communication device combined with PPS cloud services under sole identity of the PPS provider;

execute the functionality on behalf of the PPS device user using the user unique tokens in conjunction with PPS cloud services; and store user device activity involving the user unique tokens within the PPS cloud services mapping the communication device and transaction activity to the PPS device user's identity and enabling the PPS provider to fully execute the functionality on behalf of the PPS device user.

17. The one or more non-transitory computer-readable media of claim 16, wherein the functionality supports internet application services with an internet provider and wherein the memory storing computer-readable instructions that, when executed by the processor, further cause the computing platform to:

initiate installation of an internet services app based on selected service features on the communication device;

receive an indicator indicative of a selected source of funds for reimbursing the PPS provider for streaming content;

creating an account subscription for the communication device with the internet provider with a pseudo-credential, wherein the account subscription is based on an account of the PPS provider; and binding the pseudo-credential to the internet services app, wherein the internet services app executes on the communication device to access streaming content.

18. The one or more non-transitory computer-readable media of claim 17, wherein the functionality supports payment services with a merchant and wherein the memory storing computer-readable instructions that, when executed by the processor, further cause the computing platform to:

generate a payment token signed by the PPS provider for a requested amount, wherein the requested amount is guaranteed redeemable upon presentation to the PPS provider;

receive the payment token from a merchant device of the merchant;

validate a signature of the PPS provider of the payment token based on the signature of the PPS provider; and in response to the validation, initiate transfer of the requested amount into a designated account.

19. The one or more non-transitory computer-readable media of claim 16, wherein the functionality supports person to person money transfer services from the PPS device user to another individual and wherein the memory storing computer-readable instructions that, when executed by the processor, further cause the computing platform to:

generate a payment token signed by the PPS provider for a requested amount, wherein the requested amount is guaranteed redeemable upon presentation to the PPS provider;

receive the payment token from another device of another individual;

validate a signature of the PPS provider of the payment token based on the signature of the PPS provider; and in response to the validation, initiate transfer of the requested amount into a designated account.

\* \* \* \* \*